Patented Oct. 4, 1927.

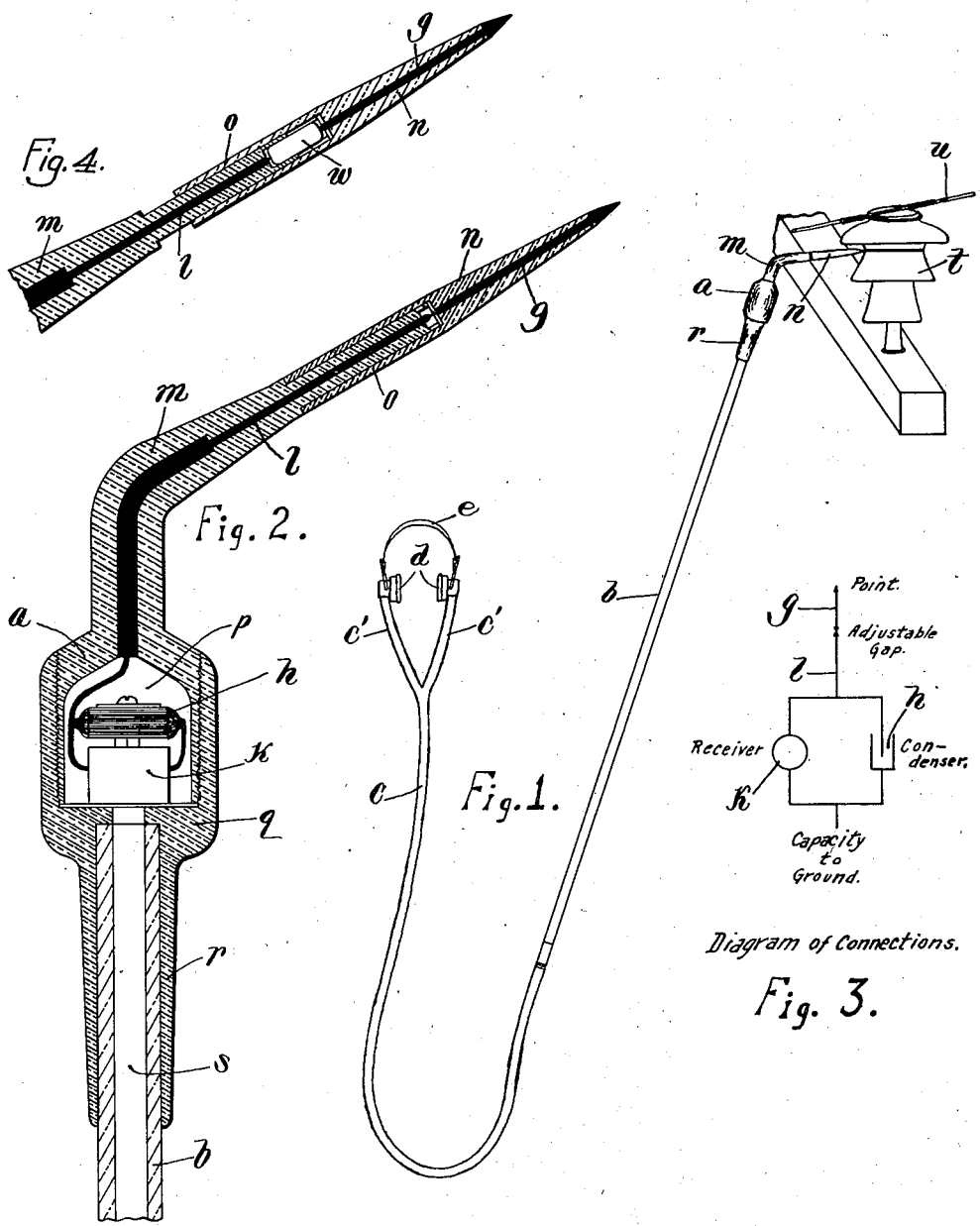

1,644,421

UNITED STATES PATENT OFFICE.

FRANK C. DOBLE, OF CAMBRIDGE, MASSACHUSETTS.

APPARATUS FOR INDICATING VOLTAGE STRESS.

Application filed June 10, 1922. Serial No. 567,283.

The object of the present invention is to provide an instrument or device which may be used, with safety to the operator, for testing the insulating qualities of electrical insulation under conditions of high voltage stress, and, in general, indicating the presence of voltage stress and measuring the intensity of such stress. One particular use for which the device is intended is that of testing the insulators by which the wires of high tension power transmission lines are carried. Such insulators are placed between extremely high differences of potential, amounting to many thousands of volts, but, being made almost universally of porcelain or glass, they are comparatively fragile and are very liable to fracture and other damage which destroys or largely diminishes their insulating qualities. At the same time, the conditions surrounding high tension electrical lines make it of the utmost importance that the insulators be maintained in fully effective condition; and this in turn requires that insulators before being put in service be tested to ascertain whether their strength of electrical resistance is sufficient, and that those in service be tested from time to time to determine which ones, if any, have deteriorated below the established standard of insulating quality. Also, the danger to operators employed in making such tests of being killed or seriously injured by receiving through their bodies current discharges from electrical conductors at high potential above ground, imperatively requires that the testing instrument contain safeguards adequate to protect them from this danger.

The testing device which forms the subject of this invention is designed and adapted to be placed close to, or in contact with any part of an insulating unit under voltage stress, or directly in contact with a conductor charged with the highest voltage, while the operator is in contact with ground, and it is provided with means for giving to the operator a sensible indication of the existence of voltage stress at the point at which it is so placed, with adequate insulation effectively preventing appreciable current flow through the instrument to the operator, and, preferably, with means for quantitatively measuring the value of the voltage stress indicated. For a complete description of the instrument and statement of the new step in the art in which the invention consists, reference is directed to the following specification and appended claims, in connection with the drawings furnished herewith.

In said drawings,

Figure 1 is a perspective view showing the preferred embodiment of the invention applied to the use of testing so-called pin type insulators.

Figure 2 is a central section on a larger scale of that part of the testing device which contains the indicating means.

Figure 3 is a diagram of one of the many possible arrangements of the electrical equipment forming part of such indicating means.

Figure 4 is a fragmentary view showing a modification.

Describing in detail the specific device thus illustrated, $a$ represents the indicating part of the instrument, which may, for convenience, be called an indicator or detector, $b$ represents an insulating holder, which is also part of a sound-conducting conduit, $c$ represents a flexible sound-conducting tube preferably of insulating material, arranged as a continuation of such conduit, and $d$ represents terminal ear pieces at the ends of branches $c'$ $c'$ of the flexible tube, which are adapted to be placed against the ears of the operator, and there held, if desired, by a head band $e$, of any suitable character.

The said indicating part or detector $a$ comprises a terminal conductor $g$, a condenser $h$, a telephonic receiver $k$, and a conductor $l$ between the condenser and receiver on the one hand, and the terminal conductor $g$ on the other hand, from which it is separated by an adjustable gap. These parts are held in proper relation to each other, encased, and insulated from surrounding objects and media (except as to the terminal point of the conductor $g$) by suitably rigid and suitably non-conducting material, such as molded and vulcanized hard rubber composition, though other materials having sufficient mechanical strength and sufficient insulating qualities may be used. Such insulating material or casing is formed in several parts or bodies, one of which, $m$, embeds the conductor $l$, while another part, $n$, embedding the terminal conductor $g$, is in adjustable connection with the part $m$, through a sleeve extension $o$ making a telescopic slip joint with the adjacent end of part $m$. This slip joint allows the width of the gap between the contiguous ends of the conductors $g$ and $l$ to be adjusted from a minimum of zero, when the conductors are in contact, to any desired maximum. The opposite end of the insulating body $m$ is enlarged to form a chamber $p$ in which are contained the receiver and the condenser, and to this body is secured detachably (here shown as by screw threads) a closure $q$, terminating in a socket $r$ in which the holder $b$ is entered and made fast.

The insulating casing above described constitutes one essential part of means embodied in this invention for making the apparatus safe to use under all conditions where tests of high tension electrical equipment can feasibly be made. Other parts of such safety means comprise the insulating holder $b$ and sound conducting conduit, later described in detail, by which the operator is enabled to use the apparatus while remaining himself at a safe distance from any conductor of high potential current. We are now concerned, however, with the insulating medium or material which encloses and encases the electrically conductive members of the detector. All of such conducting parts, except, preferably, the smallest part which will suffice as a contact terminal (the extremity of the conductor $g$) are completely enclosed by insulating material of which dielectric strength is great enough to withstand the maximum voltage to which, under conditions of use, the apparatus is liable to be subjected. It will be noted from the drawing that the insulating bodies $m$ and $n$ have substantial thickness, except at the terminal point, and the thickness of such insulators increases away from the exposed terminal point; and that the telescopic joint between parts $m$ and $n$, the threaded joint between the parts $m$ and $q$ encasing the telephonic receiver, and the joint between the casing and the holder $b$, at the socket $r$, all have substantial length. The dielectric strength of the insulating material is great enough at any point to sustain the voltage stress to which it may be subjected when the exposed terminal is placed in contact with a conductor carrying high tension currents of the order of magnitude contemplated in this specification, and the joints above referred to are long enough to provide air gap insulation of equivalent value. That is, the conditions prescribed by recognized safe practice establish the maximum of voltage stress or potential difference which may exist at any given distance from the high tension conducting line, and the dielectric strength of the insulating material of this apparatus, at any distance away from the exposed terminal is substantially great enough to withstand the voltage stress existing at equal distances from the conducting line, preferably with a factor of safety. In this description the air contained in the joints between the parts of the insulating casing is considered as an insulating medium, and these joints are made long enough to prevent electric discharge through them under the maximum stress occurring at distances from the line conductor equal to the distances of such joints from the exposed terminal of the apparatus. All of the conductive material in the apparatus is thus encased and protected, preventing exposure of any such length of good conducting material as might cause a short circuit or ground of a live transmission line, or an insulator supporting such line, or any considerable part of such insulator.

When any such short circuit or ground takes place there may occur a power arc or discharge dangerous to the life of an operator or other person in the vicinity, and dangerous electric stresses may occur in parts of the entire electrical system attached to the line, liable to cause serious damage. The insulating casing prevents any such arc or discharge from taking place, and cooperates with the insulating holder to safeguard the operator and the line itself when the testing instrument is used in connection with a high tension electrical transmission line.

The holder $b$ in the form of the invention here disclosed is preferably made in the form of a tube, whereby it combines the characteristics of both a holder and a sound conduit, as previously stated. The inner walls enclosing the bore $s$ of this tube in effect constitute the conduit element thereof, and the material in the outer part of the tube constitutes the supporting element or holder proper, and is of sufficient bulk, strength and rigidity to support the detector, mounted on one end of the tube, when the opposite end is held by an operator. Both elements embodied in the tube, namely, the holder element and the conduit element, are of good electrically insulating material having sufficient insulating value to protect an operator, in contact with the ground, from harmful effects from a current of the voltages carried by the high tension transmission lines in connection with which the specific instrument is designed to be used, when the detector is in contact with such a line. In other words the holder is an insulator against high tension currents. Its length is great enough to enable the operator to remain at a safe distance from the line when so manipulating the holder as to place the detector in the desired proximity to the line, or to an insulator supporting the line. I have found that dry wood is a suitable material for the holder, as it combines the necessary strength and rigidity with insulating capacity. In order to preserve these qualities the wood is coated or impregnated with a waterproofing material, which is also an insulator, such as paraffin, oil compounds, varnishes, and so forth. Any other combination of insulating holder and insulating sound conductor, equivalent for the purposes herein set forth to the specific combination above described, is within the scope of my invention and of the protection hereinafter claimed.

The flexible tube *c* is provided to continue the sound conduit to the ears of the operator and at the same time permit free movement of the rigid holder. A vulcanized rubber composition comprising a high percentage of pure Pará rubber is the preferred material for this part of the apparatus, because of its flexibility, high insulating value, and other qualities useful in this connection, although my invention is not limited to that particular material. Insulating value is given to this tube for added protection against harm to the operator if the slack of the tube between the operator and the holder should happen to contact with some live part of a power-carrying line. Except for the danger of this flexible tube accidentally falling against a live conductor, the member *b* alone is sufficient to provide the required safeguard.

The terminal ear pieces *d* do not involve any electrical equipment except as they may be made of electrically insulating material for still greater protection, but are simply adapters to bring the air column from the detector to the ears and exclude extraneous sounds. In construction they may be of any known type, such as envelopes adapted to surround the external orifice of the ear (as here shown) or as nipples adapted to enter the ear cavity.

In using the testing device for the purposes indicated, the operator places himself at a safe distance from the insulator to be tested, but at the same time so near that when grasping the holder at a safe distance from the terminal point of the detector, he may place such terminal point in contact with the parts of the insulator which he desires to test, or with the conductor attached to the insulator, if desired. If, then, the terminal point is placed in contact with the live conductor, or with some part of the insulator where a sufficiently high voltage stress exists, or if it is placed in a region of sufficiently high voltage near the conductor or the insulator, an electrical action takes place in the conductors *g* and *l* of the detector, causing sound to be produced at the telephonic receiver. This sound is carried by the air column in the tube *b* to the ears of the operator, giving to him an audible indication of the presence of voltage stress at the point of examination. The foregoing statement assumes that the voltage stress is sufficient to overcome whatever resistance is opposed to flow of electricity by the gap between the conductors *g* and *l*. Obviously if this stress is not great enough to overcome this resistance, no signal will be given. Thus the occurrence or the absence of an audible signal indicates qualitatively whether the voltage stresses existing in the region explored are high or low relatively to the voltage condition at the operator's standpoint.

A greater or less voltage stress is required to cause such indications according as the gap is longer or shorter, and in some regular proportion to the length of the gap. Thus the gap is a quantitative measure of the value of the stress. By setting the gap at a length which permits an indication to be made under a certain voltage condition, but from which if the length is made greater, no indication occurs, other things being equal, it is possible to ascertain by reference to a table of gap settings the approximate value of any unknown voltage stress being measured. In the use for testing insulators, the presence or absence of an indication when the gap is set for a predetermined stress which a good insulator will stand, determines whether or not the particular insulator being tested is up to standard or is deficient.

In Figure 1 of the drawing the use of the invention is illustrated in connection with an insulator of the pin type. Here *t* represents the insulator as a whole and *u* represents the high tension conductor supported by it. The point of the detector is shown as being applied to the junction beneath the top petticoat of the insulator, this being the location at which the most pronounced results are obtained, although within the scope of the invention the test may be carried out by bringing the detector in contact with or near any point of the insulator. Having regard to the principles hereinbefore explained, the instrument being thus applied in effect measures the voltage stress above the ground potential at the point of application. In such circumstances there is always a difference of potential between the different parts of the insulators used with high tension transmission lines, except as to parts which are totally defective, and the test, by showing whether or not the stresses at given points are within predetermined limits, determines whether the several parts of the insulator are normal or deficient. Thus, for example, if the indicator shows that the voltage stress at the point of application is too high, this indicates that the part of the insulator between the point tested and the conductor is defective; but if the indication shows that the stress is too low, the probably correct conclusion to be drawn is that a part of the insulator between the point tested and the ground is defective.

The same principles and essentially the same methods of carrying out a test are used with so-called strain type or suspension insulators as with pin type insulators. In the one case the detector is placed between the different disks of the suspension insulator, whereas in the other it is ordinarily inserted between the petticoats of the pin type insulators. Both types of insulator are alike in that each consists of a series of condenser parts between the line and the ground, such condenser parts in the pin type consisting of porcelain dielectric and cement plates or films, while in the strain or suspension type they consists of porcelain dielectric and (ordinarily) metal plates embodied by the hardware connections.

The gap heretofore described is an air gap, which requires to be made exceedingly short in the measurement of relatively low voltage. In order to extend the range of adjustment in low voltages, I may substitute for the air gap a vacuum gap, or a gas having a lower electrical resistance than air. In either of these two cases, illustrated in Figure 4, I insert a tube $w$, either exhausted or containing a suitable gas under suitable pressure, in series in the conducting circuit. A convenient place for inserting such tube is between the terminals of the gap, as indicated in Figure 4, although other positions and other modes of inserting such a tube are equally within the scope of my invention and claim for protection.

In explanation of the probable causes and actions which produce the effects hereinbebore described, attention is called to Figure 3 which shows a diagram of the electrical connections which may be used in the detector and are, in effect, used in the particular embodiment illustrated in these drawings. Here the source of potential is at the terminal point of the conductor $g$ when such terminal point is in the region of voltage stress. The conductors leading from this point to the telephonic receiver, and including the adjustable gap, provide a conducting circuit of variable resistance between this source of potential and a capacity effect to ground, such capacity effect being provided by the insulating elements of the instrument, or the surrounding air, and the operator himself. The receiver and condenser are in series multiple connection between the source of potential and the capacity effect, although the circuit between these elements may with good effect be a straight series effect. However, the special circuit illustrated is preferred on account of the possibility of getting increased effects of resonance in the receiver by properly designing the relation between the condenser and the receiver.

An instrument or device having the same essential characteristics can be used according to the same method for testing insulators at the laboratory or place of manufacture, or in any other conditions where they are under voltage stress, as well as while in actual service on the line. Also conditions and regions of voltage stress in other circumstances than in connection with insulators may be tested and explored by means of an instrument having the essential characteristics of this invention. In other conditions of use than that particularly described and illustrated, other modes of supporting or mounting the instrument than by the manual action of the operatoor may be employed, all within the scope of my protection.

While the form of the invention here particularly illustrated is efficient and satisfactory, and is preferred to other possible forms for some purposes, nevertheless it is to be understood that various modifications both in construction, arrangement and number of the parts thereof have been used successfully by me, and others may be used within the general principles of the invention. Thus, for example, the condenser may be otherwise arranged with relation to the telephonic receiver, or, indeed, may be omitted entirely as a separate element, without destroying the ability of the detector to give the results described. There is always sufficient inductance and capacity in the conductors and telephonic receiver for operation of the device, apart from the condenser unit as such. However, superior results are obtained with the aid of the condenser unit, wherefore its presence is preferred. The telephonic receiver also is an exemplification broadly of a means for giving audible indications, and any electrical contrivance capable of giving such indications under the conditions contemplated is the equivalent of such receiver. Other modifications may be made in the arrangement, construction and disposition of the various insulating and sound conducting parts of the apparatus.

I claim:

1. A device for testing the insulating qualities of insulating units of high tension electrical transmission lines under voltage stress, comprising a terminal conductor adapted to be placed at points in the vicinity of such an insulating unit where voltage stress occurs, means for giving audible indications in response to the effect of such stress, and associated holding and sound conducting elements extending from said indicating means for placing the terminal conductor at the point of test and conducting said signals to an operator's ear, and being of sufficient length to extend from the operator to such an insulating unit while the operator himself is at a safe distance away from the point of voltage stress; and said elements having sufficient insulating value to safeguard the operator in the situation set forth.

2. An apparatus for testing the insulating qualities of insulating units of high tension electrical transmission lines under voltage stress comprising a conducting element adapted to be placed in close enough proximity to such unit to be affected by the voltage stress there existing, means in connection with said element and affected by such voltage stress for producing audible signals, an insulating casing enclosing said indicating means and all of said conducting element except the terminal thereof, and preventing grounding of any electrically conductive parts of the apparatus under conditions of use, and an insulating sound conductor extending from said casing and arranged to convey to the ear of an operator the sounds produced by said indicating means.

3. An apparatus for testing the insulating qualities of insulating units of high tension electrical transmission lines under voltage stress comprising a conducting element adapted to be placed in close enough proximity to such unit to be affected by the voltage stress there existing, means in connection with said element and affected by such voltage stress for producing an audible signal, and an insulating casing enclosing said indicating means and all of said conducting element except the terminal thereof, said casing at any given point having sufficient dielectric strength to withstand the maximum voltage stress normally existing between the conductor of a high tension electric power transmission line and any point in the neighborhood of such conductor at a distance from the conductor equal to the distance of said given point from the exposed terminal of said conducting element, and insulating holding and sound conducting means extending from said casing and arranged to convey to the ear of an operator the sounds produced by said indicating means while maintaining a safe distance between the operator and the electrically conductive parts of the apparatus.

4. An apparatus for testing the insulating qualities of insulating units in high tension electrical transmission lines under voltage stress comprising a terminal conductor adapted to be placed at a point in the vicinity of such an insulating unit where voltage stress occurs, means for giving audible indications actuated by the effects of such stress, an insulating casing enclosing said indicating means and all of said conductor except the terminal thereof, said casing having sufficient insulating value to withstand the maximum voltage stress normally existing in any location where said indicating means may be placed while the terminal of said conductor is in contact with such insulator or the line conductor, and associated holding and sound conducting elements extending from said terminal to such a distance, and having such insulating value that an operator making contact with the portions of said elements more remote from said terminal is at a safe distance away from the point of voltage stress.

5. A detector for indicating voltage stress at and in the vicinity of high tension electrical transmission lines comprising an insulating casing, an electrical conductor enclosed in said casing and having an exposed terminal adapted to be placed at a point where voltage stress exists, an insulating holder for said casing, means in said casing for producing sound in response to electrical action resulting from placement of said terminal at such point, and insulating sound conducting means for transmitting the sound so produced to the operator's ear; said casing, holder and sound conducting means having sufficient dielectric strength to prevent short circuiting through any part of the apparatus when said terminal is in a region of voltage stress of the order of magnitude of that existing at and adjacent to a high tension electrical power transmission line, and said holder having a length sufficient to interpose a safe distance between an operator grasping it and the region of high potential voltage stress when said terminal is placed at a point in such region.

6. An apparatus for indicating voltage stress at and in the vicinity of high tension electrical transmission lines comprising an insulating casing, an electrical conductor enclosed in said casing but having an exposed terminal adapted to be placed at a point where voltage stress exists, indicating means within and enclosed by said casing operative to produce sound in response to electrical action resulting from placement of said terminal at said point, an insulating holder on which said casing is mounted, said holder having sufficient stiffness to support and move the above described electrical equipment when grasped by an operator at a point remote from the said electrical equipment, and having sufficient length and dielectric strength between said equipment and the grasping point to prevent electrical discharge to the operator from the said point of voltage stress adjacent to a high tension electrical power transmission line; said holder having also a sound conducting channel leading from the interior of said casing where said indicating means is contained.

7. An apparatus for indicating voltage stress at and adjacent to high tension electrical transmission lines comprising an electrical conductor having an exposed terminal adapted to be placed at a point where voltage stress exists, indicating means in connection with said conductor operative to produce sound in response to electrical action resulting from placement of said terminal at said point, an insulating holder on which said conductor and indicating means are mounted, said holder having sufficient stiffness to support and move the above described electrical equipment when grasped by an operator at a point remote from the said electrical equipment, and having sufficient length and dielectric strength between said equipment and the grasping point to prevent electrical discharge from the said point of voltage stress adjacent to high tension electrical power transmission line, to the operator; said holder having also a sound conducting channel leading from the interior of said indicating means, and a flexible continuation tube of insulating material extending from the end of said channel remote from the indicator and having an orifice adapted to be placed at the ear of an operator.

8. An apparatus of the character described comprising electrical conductors in series but mechanically separate from one another, insulating bodies enclosing both conductors except the terminal extremity of one of them, said bodies having telescoping portions adjustable one on the other to obtain a gap of variable length between the adjacent ends of said conductors, the length of said telescoping portions being such as to provide air gap insulation sufficient to withstand the maximum normal voltage stress existing at the end of said telescoping portions more remote from said exposed terminal when said terminal is in a region of voltage stress of the magnitude of that existing in a high tension electrical power transmission line; an electrical sound producing device in connection with the other of said conductors and operable by such voltage stress, an insulating casing enclosing said indicator and an insulating sound conductor leading from said casing.

9. An apparatus of the character described comprising an electrical conductor having a terminal adapted to be placed at a point where high voltage stress exists, an electrical sound producing apparatus in connection with said conductor, an insulating casing completely surrounding said conductor and sound producing apparatus, and an insulating sound conducting member connected to said casing and having an orifice in position to receive sound waves propagated by said device; the casing having at any point sufficient dielectric strength to withstand the maximum voltage stress normally existing at such point, and all joints in the casing having such length as to provide air gap insulation sufficient to withstand the maximum voltage stress normally existing at the location of such joints, when the conductor terminal is subjected to voltage stress of the order of magnitude of that existing at and adjacent to a high tension electrical power transmission line.

10. A detector for measuring voltage stress comprising a casing of insulating material, a telephonic receiver in said casing, a conductor in connection with said receiver and a second conductor enclosed within the casing in series with the first named conductor but mechanically separate therefrom and having an exposed end, one of said conductors being adjustably mounted relatively to the other, whereby to produce between them a gap of variable width, and said detector being adapted for placement with the exposed terminal of the second conductor at a point of voltage stress, whereby the electrical action occurring in said conductor causes the receiver to make a sound, the length of said gap being a measure of the voltage stress which is great enough to cross said gap and cause sound producing action of the receiver.

11. In a testing apparatus for testing the insulating value of insulating units for high tension electrical power transmission lines under voltage stress, having electrical conductors in series but mechanically separate from one another, insulating bodies enclosing both conductors except the terminal extremity of one of them, said bodies having telescoping portions adjustable one on the other to obtain a gap of variable length between the adjacent ends of said conductors, the length of said telescoping portions being such as to provide air gap insulation sufficient to withstand the maximum normal voltage stress to which it is subjected when said terminal is in a region of voltage stress of the magnitude of that existing in such a power line, and said insulating bodies having like insulating value.

In testimony whereof I have affixed my signature.

FRANK C. DOBLE.